United States Patent [19]
Toki

[11] 4,174,185
[45] Nov. 13, 1979

[54] FLOATING-TYPE ANTI-OIL ANTI-IMPACT AND ANTI-WAVE BARRIER

[75] Inventor: Naoji Toki, Nagasaki, Japan

[73] Assignee: Mitsubishi Jukogyo Kabushiki Kaisha, Japan

[21] Appl. No.: 851,585

[22] Filed: Nov. 14, 1977

[51] Int. Cl.$^2$ .................... E02B 3/06; E02B 3/22; E02B 15/04

[52] U.S. Cl. .................... 405/27; 405/63; 405/65; 405/212

[58] Field of Search .................... 61/1 F, 5; 210/242, 210/DIG. 21; 405/26, 27, 63, 65, 211, 212, 215

[56] References Cited

U.S. PATENT DOCUMENTS

| | | | |
|---|---|---|---|
| 2,388,171 | 10/1945 | McVitty | 61/5 |
| 3,357,192 | 12/1967 | Hibarger | 61/5 |
| 3,703,084 | 11/1972 | Nugent | 61/1 F |

FOREIGN PATENT DOCUMENTS

1441281 6/1976 United Kingdom .................... 61/1 F

*Primary Examiner*—David H. Corbin
*Attorney, Agent, or Firm*—Wenderoth, Lind & Ponack

[57] ABSTRACT

A floating-type anti-oil, anti-impact and anti-wave barrier includes means for intercepting a flow of oil floating on the water and diverting the oil in directions at right angles to the original direction of flow, means for mitigating an impact force exerted by a ship or the like, and means for intercepting waves. The barrier comprises a first float formed by serially arranging at regular intervals a plurality of elongated floating boxes in their longitudinal direction, a second float formed exactly in the same manner as the first float and disposed parallel to the first float with opposed side surfaces of the floating boxes forming the first and second floats being located at staggered positions relative to each other. Floatable spacers having shock-absorbing and intercepting functions are interposed between such opposed side surfaces of the floating boxes in the first and second floats chains or ropes moor the respective floating boxes to each other.

7 Claims, 11 Drawing Figures

FLOATING-TYPE ANTI-OIL ANTI-IMPACT AND ANTI-WAVE BARRIER

FIELD OF THE INVENTION

The present invention relates to a floating-type barrier, and more particularly, to a floating-type anti-oil, anti-impact and anti-wave barrier that is suitable to be equipped semi-permanently around a marine installation.

DESCRIPTION OF THE PRIOR ART

Heretofore, a floating-type anti-oil, anti-wave barrier has been known and commonly used. One example of such known floating-type anti-oil, anti-wave barrier is illustrated in FIGS. 1 and 2. FIG. 1 is a perspective view showing the functioning position of the known floating-type anti-oil, anti-wave barrier, and FIG. 2 is a more detailed perspective view of a wall portion of the barrier. With reference to FIG. 1, a float consisting of a plurality of float units 2' is positioned to surround a marine installation 1'. An end surface of each elongated float unit 2' is joined with an end surface of an adjacent float unit 2' by the intermediary of a flexible barrier 3'. The marine installation 1' and the floating units 2' are moored by means of chains 4' or ropes. As is well-known, in the aforementioned position, owing to the fact that the float units 2' and the flexible barriers 3' appropriately project above and below the sea surface, the effects of intercepting oil and waves can be achieved.

Another example of the known floating-type anti-oil, anti-wave barrier is illustrated in perspective in FIG. 3(a) and in transverse cross-section in FIG. 3(b). In this example, a twin-body type float unit is employed, in which hollow cylindrical pipes 5' are arranged parallel to each other and are connected by means of struts 6' therebetween, and adjacent float units are joined together by the intermediary of a flexible or hinge-type intercepting plate 7'. In this way, a plurality of float units are connected in series so as to surround a marine installation, and thereby the effects of intercepting oil and waves can be achieved.

With the arrangemnt of single-body float units 2' in one row as shown in FIG. 1, it is not possible to safely prevent the escape or diffusion of outflowing oil, since; the outflowing oil may be caused to drift in one direction due to waves and the tide, resulting in an increase of the thickness of the oil layer to the point that it is of the same order as the draught of the adjacent float units 2', so that a part of the outflowing oil may possibly flow out of the surrounding float units 2', by being conveyed by the tide and passing under the bottom surface of the float units 2'. In addition, due to vertical movements of the float units 2' and vertical movements of the sea surface, it is difficult to perfectly prevent the outflowing oil from flowing out Accordingly, it may be thought to arrange the float units beneath the float units 2' in a plurality of rows rather than in a single row, but in such a case it is very troublesome to moor the float units 2'.

The use of the twin-body type float units shown in FIG. 3(a) was thought of to overcome the aforementioned shortcoming, and the twin-body type float unit was intended to achieve the effect of a double-row arrangement of the float units 2' in FIG. 1. If such twin-body type float units are used, then it is believed that the effect of intercepting oil, the effect of intercepting incoming waves and the shock absorbing effect when a ship collides with the float units could be improved over the system of employing one row of float units 2' as described above. However, in the currently used twin-body type float units, the struts 6' provided between the twin bodies and the connecting plates 7' may be accidentally broken due to rpeated fatigue caused by waves. Therefore, there remains uncertainty as to the durability of such units. Accordingly, development of a more excellent float unit has been desired.

As described above, the float in the prior art was, in most cases, used as an oil fence against oil flowing outwardly in the event of an accident, and it was considered that the around would be positioned around an installation upon occurrence of an accident and then removed after completion of the collection or treatment of the outflowing oil. Thus the prior art device was useful even if its durability was somewhat poor. However, in the case when the float is to be semi-permenently positioned around; a marine installation under severe marine phenomena, the prior art float is not satisfactory with regard to strength and durability.

SUMMARY OF THE INVENTION

Therefore, it is one object of the present invention to provide a strong and durable float that can be utilized for many purposes as an anti-oil, anti-impact and anti-wave barrier.

According to one feature of the present invention, there is provided a floating-type anti-oil, anti-impact and anti-wave barrier. including means for flow a flo of oil floating on the water and diverting the oil in directions at right angles to the original direction of flow, means for mitigating an impact force exerted by a ship or the like, and means for intercepting waves.

According to another feature of the present invention, there is provided the above-featured floating-type anti-oil, anti-impact and anti-wave barrier including a first float formed by serially arranging at regular intervals a plurality of elongated floating boxes in their longitudinal direction, a second float formed exactly in the same manner as the first float and disposed parallel to the first float, with opposed side surfaces of the floating boxes forming the first and second floats being located at staggered positions relative to each other, floatable spacers having shock-absorbing and intercepting functions interposed between such opposed side surfaces of the floating boxes in the first and second floats, and chains or ropes for mooring the respective floating boxes to each other.

According to still another feature of the present invention, there is provided the above-featured floating-type anti-oil, anti-impact and anti-wave barrier including a plurality of elongated floating boxes arranged in series at regular intervals, another series of elongated floating boxes arranged parallel to the first series, the opposed side surfaces of the floating boxes being disposed in a staggered relation to each other, spacers made of shock-absorbing material such as rubber having a resilient property being interposed between the opposed side surfaces, and the respective floating boxes being moored to each other by means of chains or ropes, whereby a part of the cross-sectional surface of the spacer provides an intercepting surface for preventing a fluid from communicating in the horizontal direction.

The above-featured floating-type anti-oil, anti-impact and anti-wave barrier according to th present invention can be utilized as a permanently installed anti-oil and anti-impact waterbreak for a marine oil storage tank, a marine plant, marine air-port, etc.

BRIEF DESCRIPTION OF THE DRAWINGS

The above-mentioned and other features and objects of this invention will become more apparent by reference to the following description taken in conjunction with the accompanying drawings, in which.

DETAILED DESCRIPTION OF THE INVENTION

Figure 1:
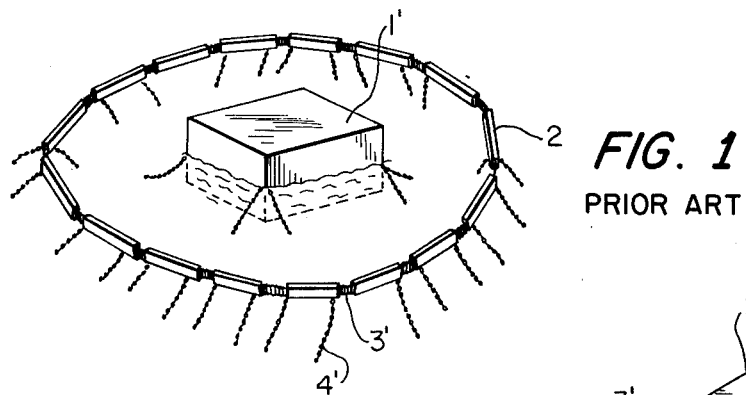
FIG. 1 is a perspective view showing the use of one example of a prior art anti-oil anti-wave barrier.
Figure 2:
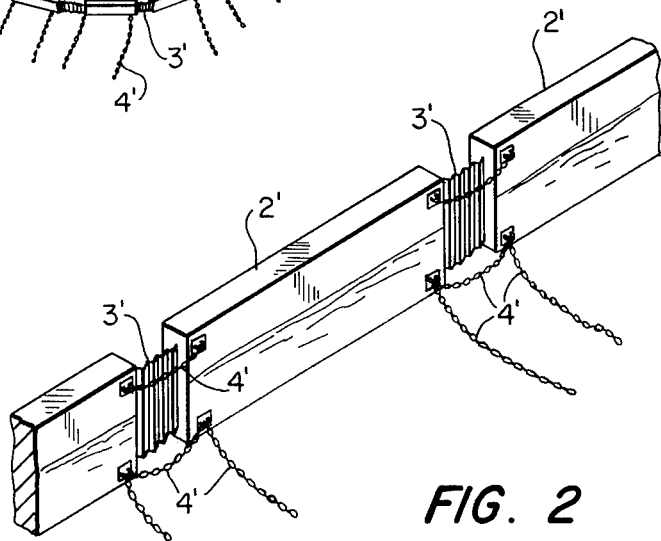
FIG. 2 is a detailed perspective view of a wall portion of the barrier of FIG. 1, FIG. 3($a$) is a perspective view of another example a prior art anti-oil anti-wave barrier, FIG. 3($b$) is a cross-sectional view of a float unit in the barrier shown in FIG. 3($a$)
Figure 3A:
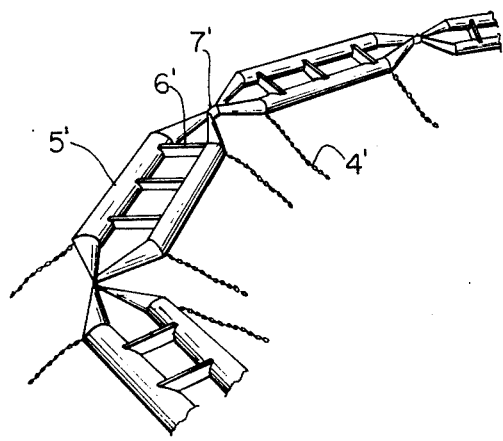
Figure 3B:
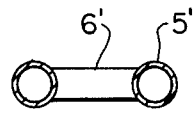
Figure 4:
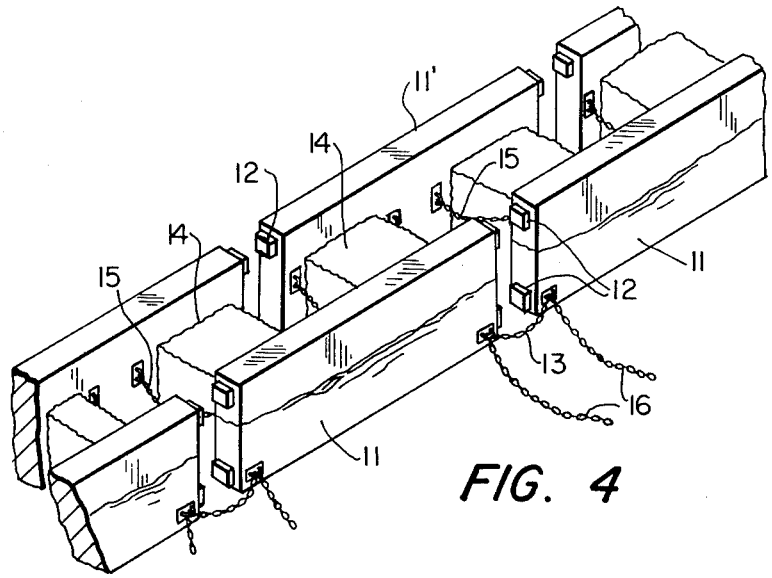
FIG. 4 is a perspective view of one preferred embodiment of the floating-type anti-oil anti-impact anti-wave barrier according to the present invention, FIG. 5($a$) is a front view of a spacer used in the embodiment shown in FIG. 4, FIG. 5($b$) is a plan view of the same spacer.
Figure 5A:
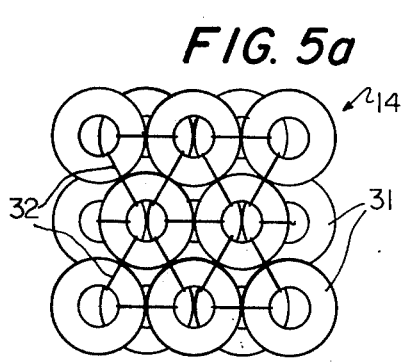
Figure 5B:
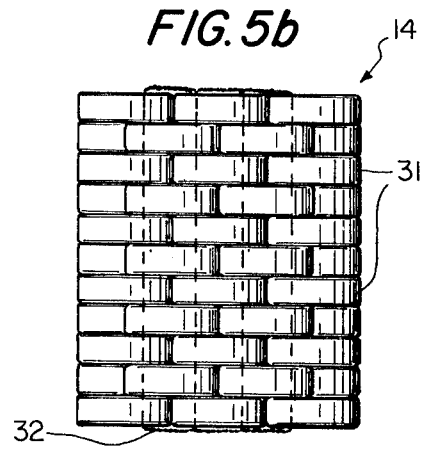
Figure 6:
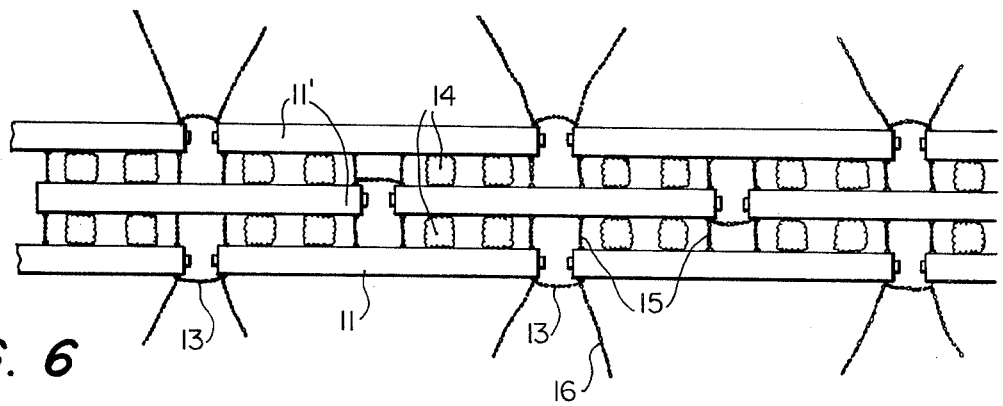
FIG. 6 is a plan view of another preferred embodiment of the present invention.
Figure 7:
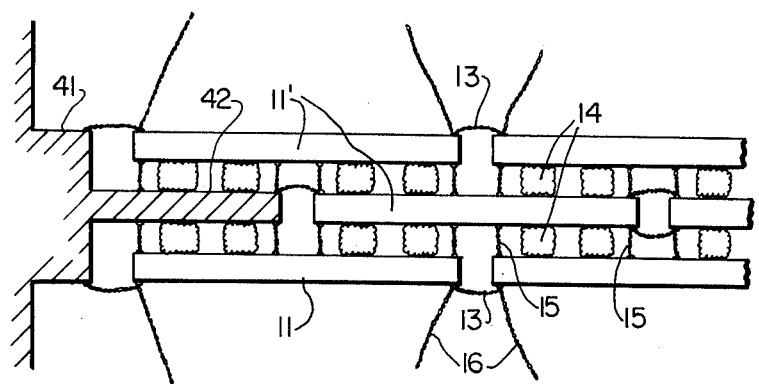
FIG. 7 is a plan view showing the embodiment of FIG. 6 shown in the moored state, operation of the device of the invention as an anti-oil barrier to a large amount of oil.
Figure 8:
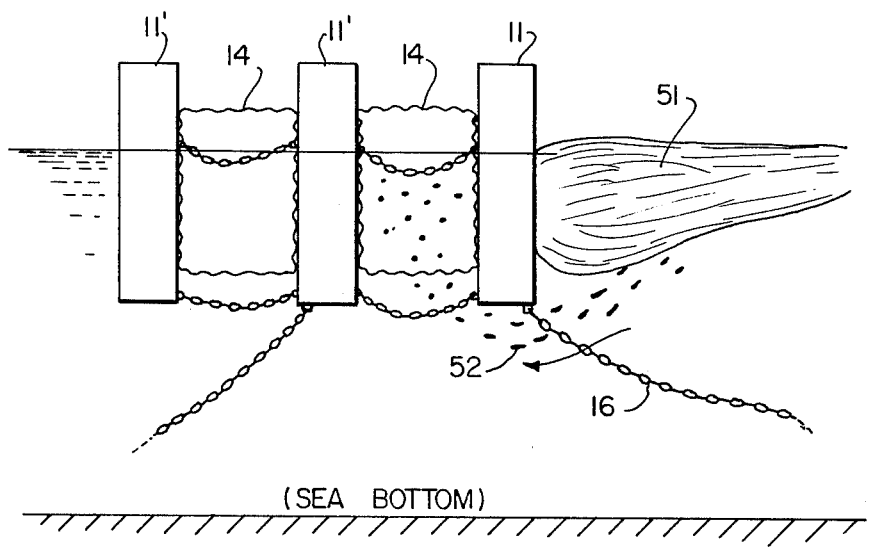

One preferred embodiment of the floating-type anti-oil, anti-impact and anti-wave barrier according to the present invention will now be explained with reference to FIGS. 4 to 9. In these FIGS. numeral 11 designates a floating box, which consists of a hollow rectangular box. Plural boxes 11 are arranged in a longitudinal direction at regular intervals to form a first float. The opposed end surfaces of adjacent floating boxes 11 are provided with fenders 12 made of elastic material for preventing damage when the end surfaces collide with each other, and the end portions are moored to each other by means of chains 13 to maintain a fixed maximum interval between such end surfaces. Reference numeral 11' also designtes floating boxes which are of the same shape as floating box 11, which are arranged parallel to and in staggered relation to floating boxes 11 to form a second float, and which are moored to floating boxes 11 by means of chains 15 to maintain a predetermined maximum interval therebetween. Reference numeral 16 designates anchor chains for anchoring floating boxes 11 and 11' to the bottom of the sea or the like. The spacer 14 illustrated in FIGS. 5($a$) and 5($b$) is formed by appropriately stacking used tires 31 and rigidly binding them together by means of ropes 32 or the like. Into a predetermined number of tires 31 is stuffed a buoyancy material such as foamed styrole so that the spacer 14 will float at an appropriate draught, and also styrole bodies and films are inserted into the spacer 14 so that at a part of a transverse cross-section a flow of fluid in the horizontal direction may be intercepted. FIG. 6 is a plan view of a modified embodiment in which the floating boxes 11 and 11' are disposed and aligned in three rows, and FIG. 7 shows another preferred embodiment in which a jetty 42 projecting from a quay 41 is connected on opposite sides thereof via spacers 14 to the floating boxes 11 and 11", as if the jetty 42 were to form a part of the floating box.

Now the operation of the floating-type anti-oil, anti-impact and anti-wave barrier according to the present invention will be explained. At first the function as an oil intercepting barrier will be described with reference to FIG. 8 in connection with the situation where a large amount of oil has spilled from a marine installation due to an accident or the like, with the marine installation being surrounded by the assembly of floating boxes 11 and 11' constructed as shown in FIG. 6. Even if the assembly of floating boxes 11 perfectly surrounds outflowing oil 51, at certain locations of the assembly of floating boxes 11 the outflowing oil 51 is driven by the action of the tide and waves into a thick accumulation of oil, and due to vertical movements of the floating boxes 11, a part of the outflowing oil 51 becomes oil drops 52, which pass under the bottom surface of the inner floating box 11 and under the bottom surface of the spacer 14 and then float up to the water surface in the gap or space confined by the pair of floating boxes 11 and 11' and the spacer 14. Accordingly, it is difficult for the oil drops 52 to undergo movements such that they drift over the first floating box 11 and then further drift over the second floating box 11', or that they drift over the first spacer 14 and then drift over the next adjacent spacer 14 located at a lateral position. Therefore, the device of the invention fully functions as an oil intercepting barrier as originally intended. Further, if the number of parallel rows of floating boxes 11' is increased, then the device may amply function as an oil intercepting barrier, even under the action of violent waves.

Figure 9:
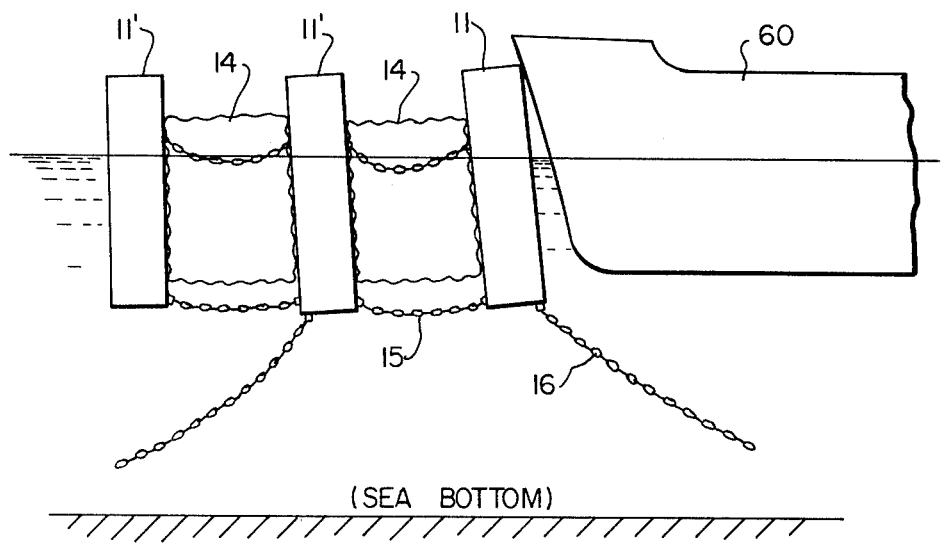
FIG. 9 is a diagrammatic view showing the operation of the device of the invention as an anti-impact barrier.

Next, the function of the device as an anti-impact barrier will be described with reference to FIG. 9. If a ship 60 should accidentally collide against the floating box 11, then the floating box 11 would be displaced in the direction as urged by the ship, while being pulled by the anchor chains 16, and the spacer 14 is compressed between two floating boxes 11 and 11'. Since the spacer 14 is made of a large number of used tires having a resilient property, it can absorb the kinetic energy of the collided ship 60. This energy absorbing effect would become more effective as the number of parallel rows of the floating boxes 11' is further increased and as the number of spacers 14 is increased.

In addition, the effect of the device as an anti-wave barrier is also remarkable, because the energy of waves can be dissipated by effectively making use of the frictional attenuation of energy caused by the relative movement between the boundary consisting of the spacer 14 and the floating boxes 11 and 11' and the water confined therein.

The floating-type barrier according to the present invention is constructed as described above, can be utilized for many purposes such as anti-oil, anti-impact and anti-wave purposes, and can achieve the following effects:

(1) While the flexible barrier provided between end surfaces of floating boxes according to the prior art was liable to be broken by wave motions, the floating-type barrier according to the present invention will be durable even when used as a semi-permanent installation by constructing the spacer 14 as an intercepting structure such that oil cannot flow across the spacer.

(2) In the case of the prior art twin-body type float units, the struts thereof having a rigid structure were likely to be broken due to fatigue. However, with the flexible connection structure consisting of spacers and chains in accordance with the present invention, there exists no such danger.

It is to be noted that with regard to the floating boxes, while an elongated rectangular body having a width and a height of about 1–5 m and a length of about 10–50 m was employed, a cylindrical pipe could be used. In such case, the side surface of the spacer must have a configuration conformed to the outer circumferential surface of the pipe. With regard to the spacer, besides the bound used tire arrangement discussed above, various other floatable and resilient materials can be used either singly or in combination. For instance, one may employ rubber materials, foamed styrole, polyurethane, etc. as materials for the spacer.

What is claimed is:

1. A floating anti-oil, anti-impact and anti-wave barrier comprising:

a plurality of hollow, elongated floating members each having longitudinally extending sides and opposite ends;

said floating members being aligned and connected in at least two separate rows in end-to-end fashion with regular intervals between adjacent ends of adjacent floating members, to thereby form at least two separate elongated floats, each said interval between adjacent floating members being substantially less than the dimension of said sides of each said floating member, taken in the longitudinal direction of each said float;

said floats being arranged and connected in laterally spaced relation to each other with spaces between adjacent said floats, said adjacent floats being longitudinally staggered with respect to each other, such that said longitudinal sides of said floating members of each said float laterally face and longitudinally overlap said intervals of adjacent floats; and a plurality of flexible floating spacers positioned in said spaces between laterally adjacent said floats, each said spacer being in contact with respective of said longitudinal sides of respective said floating members of said adjacent floats.

2. A barrier as claimed in claim 1, comprising at least three separate said floats.

3. A barrier as claimed in claim 1, wherein adjacent said floating members and adjacent said floats are connected by flexible connections.

4. A barrier as claimed in claim 3, wherein said flexible connections comprise chains or ropes.

5. A barrier as claimed in claim 1, wherein each said spacer comprises a plurality of tires bound together.

6. A barrier as claimed in claim 5, wherein said tires have positioned therein a buoyant material.

7. A barrier as claimed in claim 1, wherein said floating members each have a box-shaped configuration.

* * * * *